(12) United States Patent
Zutz

(10) Patent No.: US 6,550,778 B1
(45) Date of Patent: Apr. 22, 2003

(54) AXIAL FACE SEAL

(75) Inventor: Hans-Henning Zutz, Wermelskirchen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 09/715,008

(22) Filed: Nov. 20, 2000

(30) Foreign Application Priority Data

Nov. 20, 1999 (DE) .......................................... 199 55 858

(51) Int. Cl.[7] .............................................. F16J 15/34
(52) U.S. Cl. ........................ 277/358; 277/396; 277/403
(58) Field of Search ................................. 277/358, 390, 277/396, 399, 403

(56) References Cited

U.S. PATENT DOCUMENTS

| | | | | | |
|---|---|---|---|---|---|
| 2,185,478 A | * | 1/1940 | Tschappat | ................ | 285/123.6 |
| 2,880,678 A | * | 4/1959 | Hoffer | ..................... | 418/1 |
| 3,167,321 A | * | 1/1965 | Land et al. | ................. | 277/348 |
| 3,272,519 A | * | 9/1966 | Voitik | ........................... | 277/399 |
| 3,403,916 A | * | 10/1968 | Durham et al. | ............ | 277/356 |
| 3,540,743 A | * | 11/1970 | Ashton et al. | .............. | 277/382 |
| 4,436,315 A | * | 3/1984 | Hatch et al. | ................ | 277/390 |

OTHER PUBLICATIONS

Beer & Johnston, Jr., "Vector Mechanics for Engineers: Statics and Dynamics", 1988, McGraw–Hill Publishing Company, Fifth Edition, p. 19, Lines 6–8.*

* cited by examiner

*Primary Examiner*—Anthony Knight
*Assistant Examiner*—Doug Hutton
(74) *Attorney, Agent, or Firm*—Venable; Norman N. Kunitz

(57) ABSTRACT

An axial face seal has a sliding ring and/or a counter-ring for use with an elastic roll body. The ring has a seal leg having a sliding surface, and a supporting portion with a conical circumferential surface outside of the sliding surface for accommodating the elastic roll body. The seal leg also has an extended region that extends past the supporting portion. A reinforcement for the extended region is located between the extended region and the supporting portion.

2 Claims, 1 Drawing Sheet

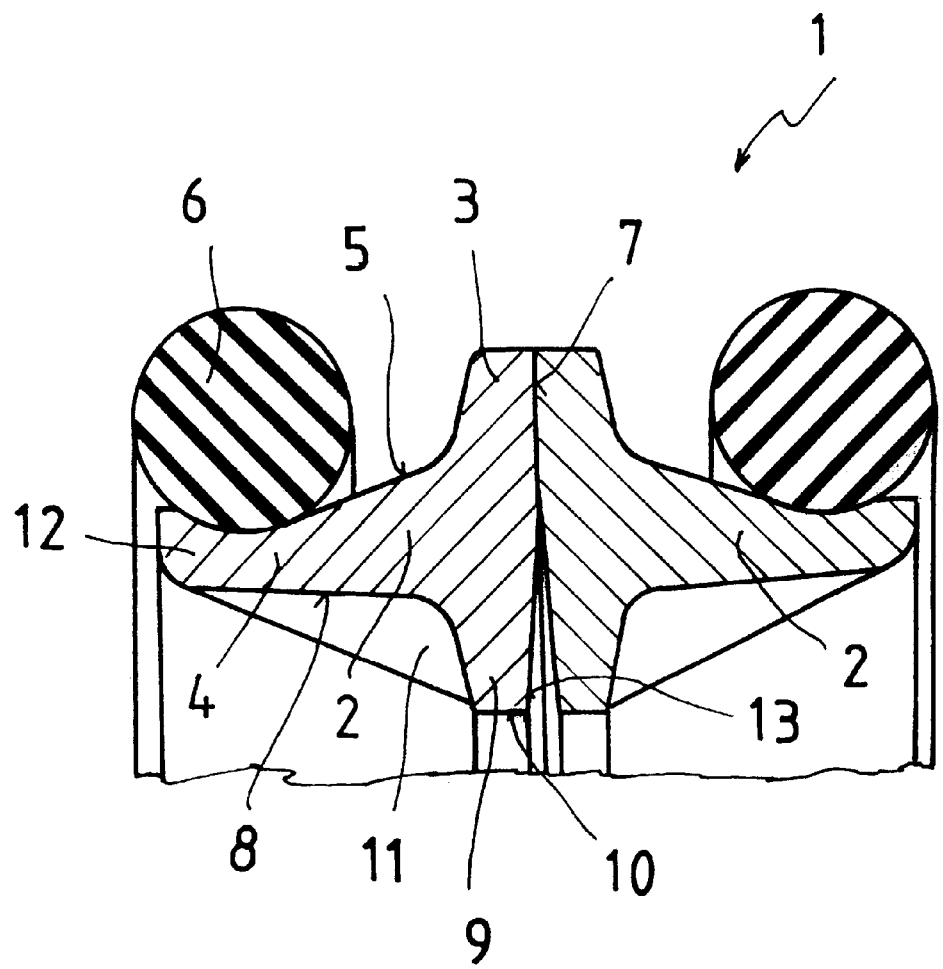

AXIAL FACE SEAL

CROSS-REFERENCE TO RELATED APPLICATIONS

This application claims the right of priority of German patent application No. 199 55 858.2 filed Nov. 20, 1999, the disclosure of which is incorporated herein by reference.

BACKGROUND OF THE INVENTION

The invention relates to an axial face seal, particularly a running gear seal, including a sliding ring and/or a counter-ring, which has a sliding surface and a conical circumferential surface outside the sliding surface for accommodating at least one elastic roll body.

Running gear seals are frequently used in drive shafts of construction machinery, e.g. hydraulic excavators. These machines are subjected to high wear because of dust, sand, mud or rocks. Running gear seals as a rule consist of angular sliding rings and/or counter-rings, wherein one of the legs of the angular profile holds a sealing member. The space between the sliding ring and/or counter-ring and the sealing member is filled at least in part with dirt during the operation of the construction machine. As a result of drying and hardening, this mud can highly obstruct the freedom of movement for the seal. In some circumstances, this can lead to an early failure of the seal.

A sliding ring and/or counter-ring for an axial face seal is known from German Patent Document No. A 31 41 512, which can be used in particular under relatively high pressures. The axial face seal is provided with a conical circumferential surface for accommodating at least one elastic roll body, wherein the roll body in the assembled state is located between the conical circumferential surface and an also conical, corresponding circumferential surface of a machine part or housing part that holds the sliding ring and/or counter-ring. At least one other secondary seal extends between the sliding ring and/or counter-ring and the corresponding machine part or housing part. The sliding ring and/or counter-ring is designed to have an approximately L-shaped profile, wherein the radial leg of the L-shaped profile forms a sliding surface, which can be provided at different radial heights of the leg, depending on the design of the sliding ring and/or counter-ring.

In order to move large amounts of material, presentday construction machines are designed to have larger and larger dimensions to permit economic material transport. The running gear seals for large machinery of this type must therefore have correspondingly large dimensions to provide an effective seal for the axles and other units. The equipment manufacturer furthermore expects the seal to meet particularly high requirements concerning the service life.

SUMMARY OF THE INVENTION

It is the object of the invention to provide an improved axial face seal, so that on the one hand the high service life requirements for the seal are met and, on the other hand, the repair costs and costs for producing the seal itself can be kept low.

The axial face seal may be a running gear seal having a sliding ring and/or counter-ring having a sliding surface and a supporting portion with a conical circumferential surface outside the sliding surface for accommodating at least one elastic roll body.

According to the invention, this object and others to become apparent as the application progresses, are achieved by providing a sealing leg of the sliding ring and/or counter-ring, which has the sliding surface, with an extended region that extends past the supporting portion. In a further aspect, the extended region of the sealing leg is reinforced.

The design of the sliding surface region is particularly important for achieving an especially long service life, wherein according to the invention the sliding surface width in radial direction can be used as wear reserve.

By extending the sealing leg with the sliding surface of the sliding ring and/or counter-ring, this leg is provided with a T-shaped contour. However, if subjected to higher stress, this contour will have a tendency to be distorted especially on the inside third because of the axial forces that must be controlled. The design according to the invention therefore calls for reinforcing this region. Owing to the fact that a cast, solid profile may be undesirable for cost reasons, various other options for creating the necessary stiffness may be employed while avoiding a solid profile and still keeping the material costs as low as possible.

Sections where the material is thickened in the form of projections or shoulders are viewed as suitable embodiments. Since a material thickening along the entire circumference may not be desirable, these sections can have optional dimensions, so that a plurality of profiles forming material thickenings are provided, distributed in circumferential direction.

A preferred alternative provides for projections extending between the extended sealing leg of the sliding ring and/or counter-ring and the leg that accommodates the roll body.

According to another aspect of the invention, the shaped projections extend between the free ends of the extended sealing leg on the one hand and the leg holding the roll body on the other hand. With respect to the production, the shaped projections can be designed as fins that are molded onto the inside circumferential area of the sliding ring and/or counter-ring.

By virtue of the above features, the complete profile of the sliding ring and/or counter-ring is provided with the required stiffness and thus also the freedom from distortion for all stress conditions and material use is reduced to an acceptable minimum.

The evenness of the sliding surface is ensured even if the location of the sliding surface has moved to the radial inside region of the sealing leg because of wear.

BRIEF DESCRIPTION OF THE DRAWINGS

The FIGURE is a partial cross sectional view of an axial face seal according to a preferred embodiment of the invention.

DETAILED DESCRIPTION OF THE PREFERRED EMBODIMENTS

The FIGURE shows an axial face seal 1, consisting of two sliding rings or counter-rings 2 with identical structural geometry in this example, so that in the following explanation reference is made only to a sliding ring 2. The sliding ring 2 comprises a radially extending sealing leg 3 as well as an axially extending supporting leg 4 having a conical outer circumferential surface 5, which is provided to accommodate an elastic roll body 6. The supporting leg 4 has an inner circumferential surface 8 which, together with the surface, defines the thickness of the supporting leg 4. The sealing leg 3 axially adjoins the supporting leg 4 and has a portion or collar 9 which projects radially beyond the surface 8 of the supporting leg 4 and away from the thickness and the surface 8. In order to achieve a particularly long service life, the radial sliding surface 7 provided on the sealing leg 3 of sliding ring 2 is used as wear reserve by virtue of the projecting portion or collar 9 of the sealing leg 3 which is extended past the circumferential surface 8 of the leg 4 that accommodates the roll body. The cross section of the sliding ring 2 has an approximately T-shaped contour. However, this contour can have a tendency to distortion, especially on the inside third of the sealing leg 3 or the projecting portion 9, depending on the axial forces to be controlled. Reinforcing elements are provided on the inside circumferential area 10 of the extended region 9.

Shown in this example are shaped projections 11 in the form of molded-on fins or ribs, which extend from the inside circumferential area 10 of the extended region 9 to the free end region 12 of leg 4. The ribs 11 provide the complete sliding ring 2 with the required stiffness and thus freedom from distortion for all stress conditions. As a result, the amount of material used for the reinforcement can be reduced to a minimum. This design ensures evenness of the sliding surface 7, even if this surface has moved to the radially inside positioned region 13 of extended region 9 because of wear.

Alternative embodiments of the extended region 9 to be reinforced are conceivable as well. These can take the form of sectional reinforcing elements (not shown), provided between the extended region 9 and the leg 4, which may cover only partial areas of the extended region 9 as well as the leg 4. The particular embodiment of the reinforcement depends on the forces to be controlled in the sealing system.

It will be understood that the above description of the present invention is susceptible to various modifications, changes and adaptations, and the same are intended to be comprehended within the meaning and range of equivalents of the appended claims.

What is claimed is:

1. An axial face seal including a sealing ring; said sealing ring comprising:
   (a) an axially extending supporting leg having
      (1) an outer conical circumferential surface for supporting an annular elastic roll body thereon;
      (2) an inner circumferential surface defining, together with said outer conical circumferential surface, a thickness of said supporting leg; and
      (3) an axial end;
   (b) a radially extending sealing leg adjoining said supporting leg; said sealing leg having
      (1) a collar projecting radially beyond said inner circumferential surface of said supporting leg and away from said thickness; the radially projecting collar of said sealing leg having an outer circumference constituting an inner circumference of said sealing ring; and
      (2) an outer radial sliding surface being remote from said axial end of said supporting leg; and
   (c) a reinforcing rib provided on said projecting collar of said sealing leg and on said inner circumferential surface of said supporting leg; said reinforcing rib extending from said outer circumference of said projecting collar of said sealing leg to said axial end of said supporting leg.

2. An axial face seal including a sealing ring; said sealing ring comprising:
   (a) an axially extending supporting leg having
      (1) an outer conical circumferential surface for supporting an annular elastic roll body thereon;
      (2) an inner circumferential surface defining, together with said outer conical circumferential surface, a thickness of said supporting leg; and
      (3) an axial end;
   (b) a radially extending sealing leg adjoining said supporting leg; said sealing leg having
      (1) a collar projecting radially beyond said inner circumferential surface of said supporting leg and away from said thickness; the radially projecting collar of said sealing leg having an outer circumference constituting an inner circumference of said sealing ring; and
      (2) an outer radial sliding surface being remote from said axial end of said supporting leg; and
   (c) a plurality of circumferentially distributed reinforcing ribs provided on said projecting collar of said sealing leg and on said inner circumferential surface of said supporting leg; each said reinforcing rib extending from said outer circumference of said projecting collar of said sealing leg to said axial end of said supporting leg.

* * * * *